United States Patent Office.

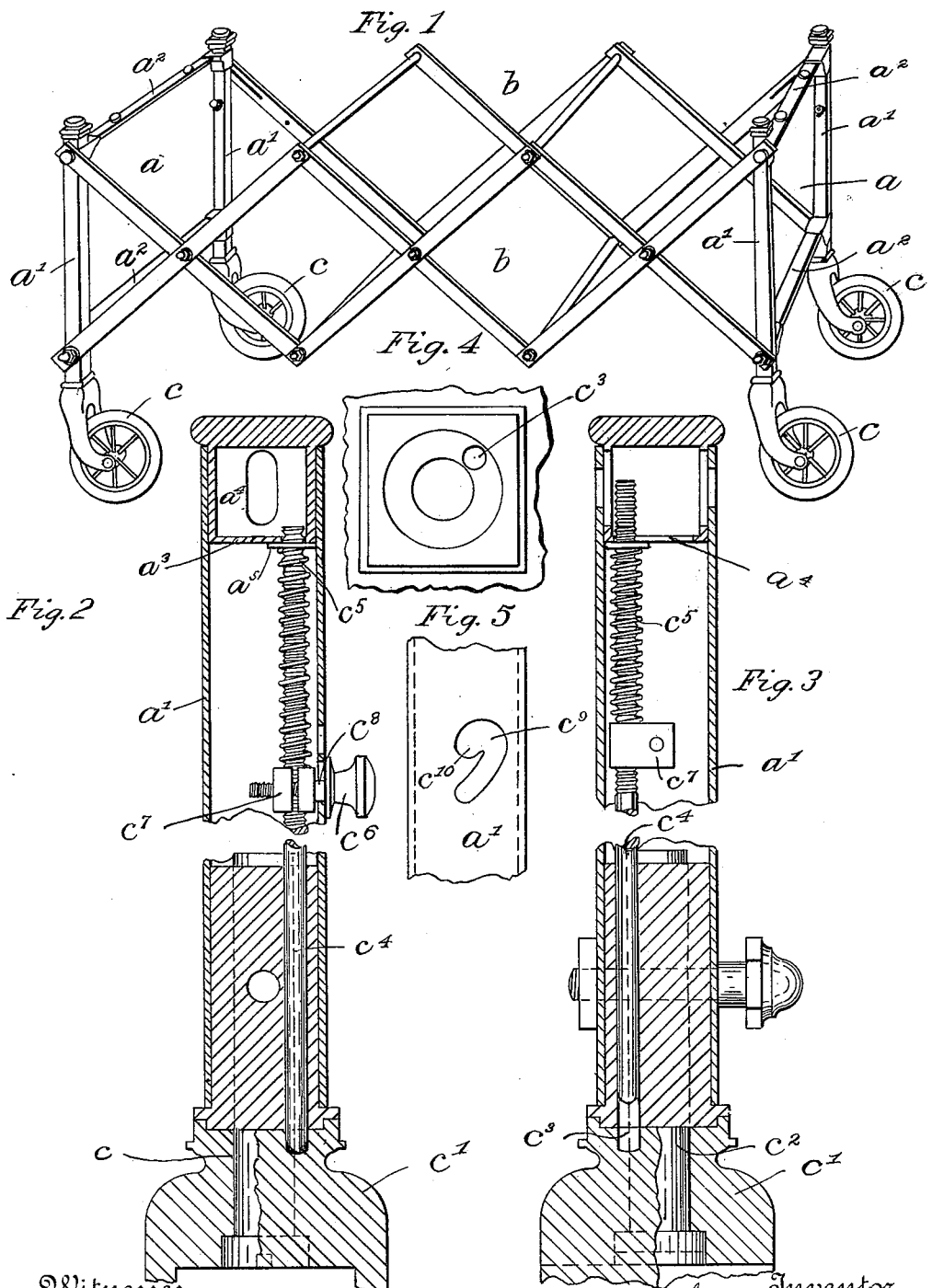

WASHINGTON H. REAMA, OF SPRINGFIELD, OHIO, ASSIGNOR TO THE SPRINGFIELD SILVER PLATE COMPANY, OF SAME PLACE.

CASKET-TRUCK.

SPECIFICATION forming part of Letters Patent No. 621,284, dated March 14, 1899.

Application filed July 30, 1898. Serial No. 687,370. (No model.)

*To all whom it may concern:*

Be it known that I, WASHINGTON H. REAMA, a citizen of the United States, residing at Springfield, in the county of Clark and State of Ohio, have invented certain new and useful Improvements in Casket-Trucks, of which the following is a specification.

My invention relates to improvements in casket trucks or pedestals.

The particular object of my invention is to provide means for locking and unlocking the caster or carrying wheels to facilitate the movements of the truck either in a straight line or for changing direction and making sharp turns within small compass. I attain this object by the constructions shown in the accompanying drawings, in which—

Figure 1 is a perspective view of a truck embodying my invention. Figs. 2 and 3 are longitudinal sectional views of the end or corner posts, showing the locking device for the truck or caster wheels. Figs. 4 and 5 are details of the same.

Like parts are represented by similar letters of reference.

In the accompanying drawings, $a\ a$ represent the end frames, composed of posts $a'$ and connecting-bars $a^2$. These end frames, as in my former application, are connected together by folding or extensible parts $b$, preferably in the nature of lazy-tongs, which permit the frames to be folded together or spread apart and held rigidly to form a truck.

At each of the corner-posts $a'$ is placed a caster-wheel $c$, on which the truck is supported and by means of which it may be transported. For moving in a substantially straight line, subject to only slight changes of direction, it is found desirable in some cases that one set of the caster-wheels be held in line with the direction of travel while the other set be adapted to turn on their vertical pivots for guiding purposes. When it is desired, however, to turn sharp corners or to turn the truck around within small limits, then it is desirable that all the wheels be adapted to turn on their vertical pivots, thus permitting the truck to be turned within the limits of its own length. To accomplish this and to provide the best arrangement for all purposes, I employ locking devices in each of the vertical posts, adapted when in certain positions to lock the caster-wheels in line with the longitudinal plane of the truck.

Each of the caster-wheels $c$ is provided with a supporting-head $c'$, having a vertical pivot which turns loosely on a stud or trunnion $c^2$, which is secured to the post $a'$. In the top of this head or frame $c'$ is provided an opening $c^3$. Within each of the posts $a'$ there is mounted a vertically-movable rod or bolt $c^4$, having at the upper end a spring $c^5$ and an adjustable knob or handle $c^6$. This knob or handle is attached to a clamping-nut $c^7$, which is screw-threaded onto the end of the rod or bolt $c^4$, the knob or handle $c^6$ being also screw-threaded, so as to pass through the parts of the nut $c^7$, and thus furnish the means for clamping the nut $c^7$ on the rod $c^4$ in any desired position of adjustment, which adjustment is obtained by having the rod or bolt $c^4$ screw-threaded where it passes through said nut. The knob or handle $c^6$ is provided with a projecting neck $c^8$, which passes through a cam-shaped opening $c^9$ in the side of the post, the said opening being arranged with a seat or shoulder $c^{10}$ to support the neck $c^8$, and thus hold the rod out of the opening $c^3$. The opening $c^3$ is so located that when the rod or bolt $c^4$ is pressed therein the wheel-frame $c$ will be held rigidly, with the wheel in line with the longitudinal plane of the truck. The slotted opening $c^9$, or that part of it below the seat $c^{10}$, is of sufficient length to permit the neck $c^8$ to be disengaged from its seat, with the end of the rod or bolt resting on top of the wheel frame or support $c'$, so that when it is desired to lock either one or more of the wheel-frames the knob $c^6$ is moved to release it from the seat $c^{10}$, thus allowing the end of the bolt $c^4$ to rest in contact with the top of the wheel frame or support, and as the frame or support moves into the proper position the bolt will be caused to engage in the opening by reason of the spring $c^5$. The bolt for this purpose is preferably rounded or beveled on the end, so as to readily enter the opening and cause the wheel to assume the proper position in the operation of locking.

To provide for guiding the upper end of the rod or bolt, I construct in the top of the post $a'$ a web or flange $a^3$, having a slotted opening $a^4$, through which the end of the rod or bolt is adapted to extend. Between this web and flange and the spring I also preferably provide a washer $a^5$, through which the rod passes and against which the spring rests. The opening $a^4$ is slotted to provide for the lateral as well as vertical movement of the upper end of the rod $c^4$, which is caused by the cam-shaped opening $c^9$ in the side of the post, the rod itself being adapted to spring laterally sufficiently to permit this lateral movement, the resiliency of the rod assisting to seat the neck $c^8$ in the seat $c^{10}$, when the rod is withdrawn from the locking position.

It will be seen from the above construction that I provide means by which either or both sets of the wheel frames or supports may be locked in the direction of travel of the truck, while for turning within narrow limits each of the said wheels may be released, thus permitting the truck to be turned within the limits of its own length, if desired.

Having thus described my invention, I claim—

1. In a truck, end frames connected together as described, a caster-wheel arranged at each corner of said truck, a locking device for each of said caster-wheels, and means for positively holding said locking devices out of engagement with each of said caster-wheels, said locking devices being each adapted when released to automatically lock and hold one of said caster-wheels when the same is moved to a predetermined position, substantially as and for the purpose specified.

2. In a church-truck having vertical end frames with the corner-posts as described, truck-wheels supported in swiveled heads in said posts, a spring-actuated locking device for each of said truck-wheels normally disengaged from said head or support, and means for holding the same out of engagement, said locking device being adapted when released to automatically engage said support and to hold the same when the same has been moved to a predetermined position, substantially as specified.

3. In a caster-truck, the combination with the end frames having the corner-posts, the truck-wheels mounted in swiveled frames on said posts, a spring-pressed locking device in said posts adapted to engage in an opening in said wheel support or frame, an adjustable knob or handle on said locking device, and means for holding said handle in different positions to cause said locking device to engage or disengage said swiveled frame, substantially as specified.

4. The combination with the frame-posts, the truck-wheels mounted in swiveled frames, the vertically-movable spring-pressed rod in said posts adapted to engage and lock said frame, a screw-threaded nut on said rod, a knob or handle attached to said nut, and a cam-shaped opening in said post to support said knob or handle in different positions, substantially as specified.

5. The combination with the swiveled head, the screw-threaded spring-pressed rod or bar, the split nut on said bar, the screw-threaded knob or handle adapted to form a clamp for said split nut, and a slotted support for said knob having an engaging seat to hold said knob, substantially as and for the purpose specified.

In testimony whereof I have hereunto set my hand this 15th day of July, A. D. 1898.

WASHINGTON H. REAMA.

Witnesses:
CHAS. I. WELCH,
EARL G. WELCH.